March 24, 1931. W. W. BROWN ET AL 1,797,519
ELECTRIC HEATER
Filed Feb. 1, 1927
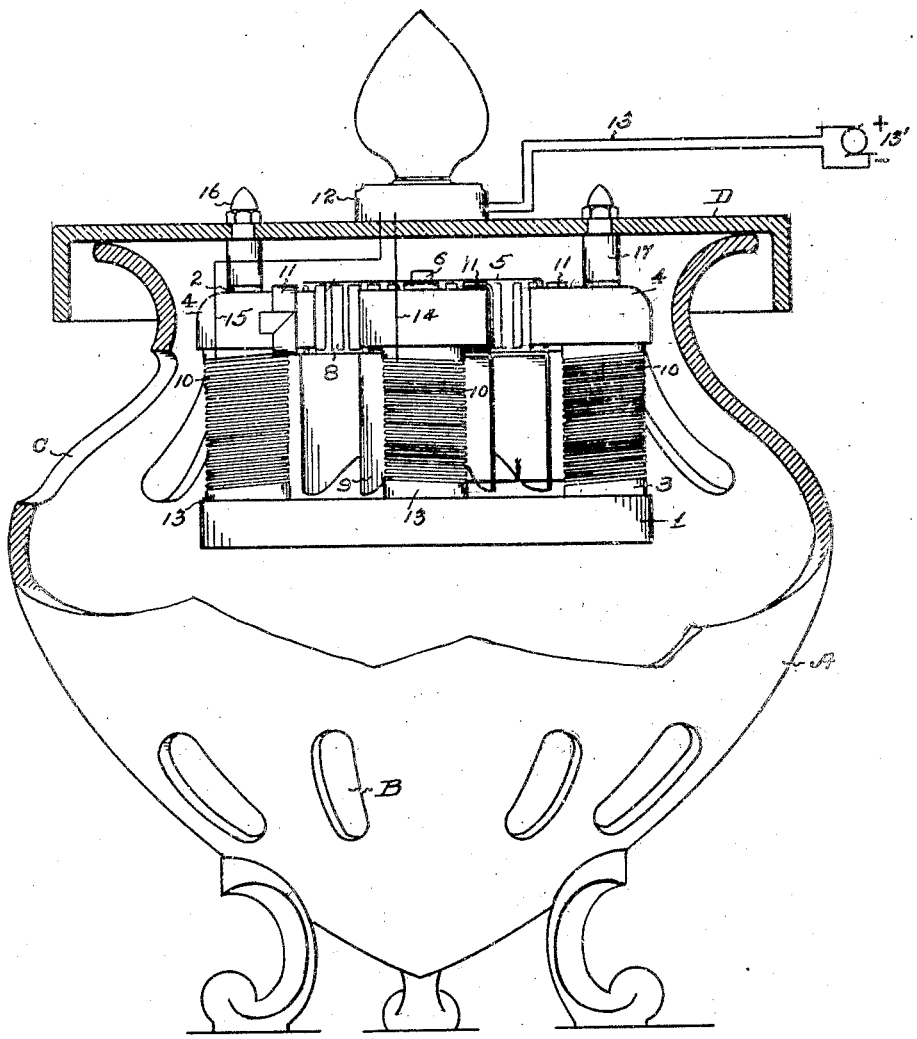
Walter W. Brown.
Floyd B. Stone.
INVENTORS
BY
Baldwin Vale ATTORNEY Patented Mar. 24, 1931

1,797,519

UNITED STATES PATENT OFFICE

WALTER W. BROWN, OF ALAMEDA, AND FLOYD B. STONE, OF SAN FRANCISCO, CALIFORNIA

ELECTRIC HEATER

Application filed February 1, 1927. Serial No. 165,119.

This invention relates to improvements in electric heaters and more particularly to electric heat generating and distributing means for heating enclosed spaces, such as human habitations, conservatories for the promotion of plant life, and other commercial and practical purposes.

The primary object of this invention is the conservation of energy in transforming electric power into heat units and distributing the same by natural radiation and mechanical propulsion, by simultaneously generating heat and rotation in a motor unit and causing a circulation of air therethrough. A further object is to produce an electro-thermo motor with the above object, that is compact, efficient, and commercially practical under the control of unskilled persons. Other objects and advantages will appear as this description progresses.

In this specification and the annexed drawings the invention is illustrated in the form considered to be the best, but I do not wish to be understood as confining it to this form, because it may be embodied in other forms, and it is also to be understood that in and by the claims following the description it is desired to cover the invention in whatsoever form it may be embodied.

In the accompanying one sheet of drawings, Figure 1 is an electric motor constructed in accordance with this invention enclosed within a vitreous bowl.

In detail the construction illustrated in the drawings comprises the base 1, preferably an annulus composed of cast iron, from which the cores 2 rise perpendicularly at spaced intervals of ninety degrees around its periphery. The base 1 acts as a magnetic yoke or path for the magnetic flux from pole to pole. These pole cores 2 are surrounded by the porcelain or other infusible shells 3, extending between the top of the base ring 1 and the under side of the pole pieces 4 fixed to the upper end of the cores 2. The inner faces of these pole pieces are segmentally curved to conform to the periphery of the rotor 5 having the center shaft or pivot 6, journaled in a cylindrical bearing fixed on the axis of the base 1 and adapted to be suitably lubricated with heat resisting oil.

This armature 5 is composed of a magnetic annulus having cylindrical openings in the periphery thereof, at close intervals. These openings are filled by sections of copper rods driven thereinto and held therein and short circuited across their opposite ends by solder flowed across the top and bottom faces of the rotor, forming in effect, short circuited windings to form what is known in the vernacular as a "squirrel cage type" armature, the solder being a non-magnetic current conducting circuit between the copper sections 8. The rotor is then chucked in a lathe by means of the shaft 6, and the periphery turned off to expose the surfaces of the magnetic body of the rotor and the copper section 8 and adapted to rotate in close proximity to the internal faces of the pole pieces 4 as is common in motor practice.

The air displacing means in the present instance is the fan 9, consisting of a number of blades curved outwardly from the axis of the rotor, with a circumference approximately equal to the circumference of the rotor 5. The width of these blades extends from beneath the pole pieces 4 to in proximity to the top surface of the base ring 1 and are adapted to draw air upwardly through the ring 1 and discharge it between and against the shells 3.

These shells 3 are provided with a helical groove or thread within which the windings 10 of the field magnets of the motor lie, each turn of the winding being insulated from the adjacent turn by the non-conducting vitreous substance forming the shells 3. These windings are composed of a high resistance wire of a suitable size, in accordance with the motor specifications. Such wire as is at present on the market for winding heating elements for various purposes is suitable. Such wire is composed of various alloys of nickel, crome and iron, giving a high ohmic resistance with the minimum of oxidation. These windings surrounding the cores 2 produce electro-magnets polarizing in the pole pieces 4 to form the magnetic field of the motor. These alternate coils are wound in opposite directions so that adjacent poles are of unlike polarity, thus establishing a magnetic circuit at a given instant.

Alternating current is introduced to the stationary windings, the adjacent poles of which are of unlike polarity, thus establishing a magnetic circuit at a given instant, as follows: from the pole face of one of the poles 4 through the rotor and into an adjacent pole face 4 down through the core 2 and coil to yoke 1, through same, up through coil 10 and pole, to pole face of origin. Due to the short circuited winding in the squirrel cage rotor, an induced current is set up in the rotor which is in opposite direction to the applied current and at such an angle electrically and in space, that at or near synchronous speed as a single phase motor, it will thus rotate indefinitely.

However, as this phenomenon exists only at, or near synchronism, means must be provided for starting from rest, and in this case the shading coils 11 are provided. These are applied by sawing into the segmental face of the pole pieces 4 adjacent one side and encircling that portion of the pole piece with a low resistance short circuited winding of copper ribbon having its ends connected. This, by induction creates a slight opposing inter-polarity sufficient for the starting torque. However, this and other known means of phase splitting methods are well known in the art and may be employed in meeting variable conditions.

This construction forms a single phase alternating current motor, the winding of which is so designed, and of such material and placed in such a manner as to produce a maximum amount of heat for the amount of electric energy consumed. The fan 9 on the rotor causes a rapid transfer of air, drawn up and laterally discharged past the heated stator or field portions of the motor, giving a maximum radiation of heat units at a minimum temperature of the motor parts, for the amount of energy transformed.

In the motor as described, the transformation of electrical energy to heat is accomplished in two ways simultaneously. First by the resistance to the passage of current through the conducting windings 10. Second by the use of a material of relatively high permeability in solid section in the magnetic circuits 1, 2 and 4, such as cast iron, causing the generation of eddy currents or Foucault currents, which from their inherent nature cause heat in the media where induced. The hysteresis or molecular friction within the cast iron also produces heat.

It is apparent that a structure in accordance with this invention must approximate 100% in efficiency. There is no loss of useful energy, since the energy not transformed directly into heat units is transformed into mechanical energy for the diffusion and dissipation of the heat generated.

It is desirable to mount the electro-thermal motor unit within a vitreous or other non-conducting and heat resisting enclosure such as the jar A, which may be of fanciful and ornamental design. The exposed snap switch 12 is fixed thereto to which the current is led through the cable 13 leading to an electric generator 13'. From the switch 12, the leads 14 and 15 connect with the windings 10. The enclosure A should be provided with openings such as B, below the heating unit, and with the openings C in alinement with the fan 9, whereby the cold air near the floor of the enclosed space to be heated is drawn upward through the openings B, through the heating motor and is driven outward by the fan 9 through the openings C in practically a horizontal line. The heating unit can be very conveniently mounted in the jar A by suspending it from the cover D. The non-magnetic cap screws 16, pass through the spacers 17 and are threaded into the tops of the cores 2. The spacers 17, permit the screws to be drawn tight against the cover. The effect of electric heating devices in which the heating element attains a luminous condition which is projected by a parabolic deflector, create in effect a concentrated projected beam of heat. Whereas in the present instance it is not intended that the heating elements 10 attain this luminous temperature, below which they are maintained by the circulation of air from the fan 9, the heating elements 10 remaining black or the color of the resistance wire of which they are composed, the temperature of the heating element attaining about 500 to 1,000 degrees Fahrenheit. In this manner excessive temperatures within the motor are avoided, and the whole atmospheric contents of the enclosure in which it is operating is gradually raised to the desired temperature by a gentle circulation through the heating device.

Having thus described this invention what we claim and desire to secure by Letters Patent is:

1. An electric air heater comprising a rotor, pole pieces surrounding said rotor, heating elements wound upon said pole pieces, said heating elements acting also to generate a magnetic flux for driving said rotor and a fan carried by said rotor.

2. An electric air heater comprising a rotor, pole pieces therefore, shading coils upon said pole pieces, heating elements upon said pole pieces adapted to generate heat and magnetic flux simultaneously and a fan carried by said rotor.

3. An electric air heater comprising a rotor of the "squirrel cage" type, pole pieces arranged about said rotor, infusible shells surrounding said pole pieces, heating elements wound on said shells acting also to generate a magnetic flux for driving said rotor and a fan carried by said rotor.

4. An electric air heater comprising a rotor, air displacing means on said rotor, pole pieces arranged about said rotor and composed of material of high magnetic permeability and solid section, heat resisting shells surrounding said pole pieces, heating elements wound on said shells having high ohmic resistance, said heating elements acting also to generate a magnetic flux for driving said rotor, whereby heat and magnetic flux are generated in said motor simultaneously, the heated air being driven off by said air displacing means.

In testimony whereof, we have hereunto affixed our signatures.

WALTER W. BROWN.
FLOYD B. STONE.